US008108769B2

(12) United States Patent
Chi et al.

(10) Patent No.: US 8,108,769 B2
(45) Date of Patent: *Jan. 31, 2012

(54) PRESENTING MULTIMODAL WEB PAGE CONTENT ON SEQUENTIAL MULTIMODE DEVICES

(75) Inventors: Chang Yan Chi, Beijing (CN); James J. Sliwa, Raleigh, NC (US); Hui Su, Beijing (CN); Leslie R. Wilson, Boca Raton, FL (US); Shi Wan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 714 days.

This patent is subject to a terminal disclaimer.

(21) Appl. No.: 12/188,539

(22) Filed: Aug. 8, 2008

(65) Prior Publication Data

US 2008/0294979 A1    Nov. 27, 2008

Related U.S. Application Data

(63) Continuation of application No. 10/732,007, filed on Dec. 10, 2003, now Pat. No. 7,434,158.

(51) Int. Cl.
*G06F 17/00* (2006.01)

(52) U.S. Cl. ...................................................... 715/239

(58) Field of Classification Search .................. 715/234, 715/239; 704/3, E17.009
See application file for complete search history.

(56) References Cited

U.S. PATENT DOCUMENTS

| 5,915,001 A | 6/1999 | Uppaluru |
| 6,052,367 A | 4/2000 | Bowater et al. |
| 6,101,472 A | 8/2000 | Giangarra et al. |
| 6,152,369 A | 11/2000 | Wilz, Sr. et al. |
| 6,286,014 B1 | 9/2001 | Fukushima et al. |
| 6,295,551 B1 | 9/2001 | Roberts et al. |
| 6,317,781 B1 | 11/2001 | De Boor et al. |
| 6,321,991 B1 | 11/2001 | Knowles |
| 6,338,434 B1 | 1/2002 | Wilz, Sr. et al. |
| 6,356,529 B1 | 3/2002 | Zarom |
| 6,356,908 B1 | 3/2002 | Brown et al. |
| 6,425,131 B2 | 7/2002 | Crandall et al. |
| 6,771,743 B1 | 8/2004 | Butler et al. |
| 7,216,351 B1 * | 5/2007 | Maes ........................... 719/328 |
| 7,277,951 B2 | 10/2007 | Marriott et al. |
| 2001/0048676 A1 | 12/2001 | Jimenez et al. |
| 2002/0054090 A1 | 5/2002 | Silva et al. |
| 2002/0194388 A1* | 12/2002 | Boloker et al. ............... 709/310 |
| 2002/0198719 A1* | 12/2002 | Gergic et al. ............. 704/270.1 |
| 2006/0168095 A1 | 7/2006 | Sharma et al. |

FOREIGN PATENT DOCUMENTS

| EP | 1100013 | 5/2001 |
| JP | 2001154852 | 6/2001 |
| KR | 2001069793 | 7/2001 |
| WO | WO 01/63949 | 8/2001 |

* cited by examiner

*Primary Examiner* — Laurie Ries
(74) *Attorney, Agent, or Firm* — Novak & Quigg LLP

(57) ABSTRACT

A method of accessing an Extensible Hypertext Markup Language Plus Voice Web page can include the step of receiving a request for an Extensible Hypertext Markup Language Plus Voice Web page from a source that lacks the ability to directly render the Web page. The Web page can be segmented into a multitude of fragments, where each fragment can consist of a single interface category, such as a graphical user interface category or a voice category. These fragments can be used to provide the requesting source with information from the Web page.

22 Claims, 3 Drawing Sheets

PRESENTING MULTIMODAL WEB PAGE CONTENT ON SEQUENTIAL MULTIMODE DEVICES

CROSS REFERENCE TO RELATED APPLICATIONS

This application is a continuation of, and accordingly claims the benefit of, U.S. patent application Ser. No. 10/732,007, filed with the U.S. Patent and Trademark Office on Dec. 10, 2003.

BACKGROUND

1. Field of the Invention

The present invention relates to the field of computer software and, more particularly, to presenting multimodal Web page content on sequential multimodal devices.

2. Description of the Related Art

Web-based applications can be accessed through a variety of interfaces falling into a graphical user interface (GUI) category and voice category. The GUI category can include input and output interface modes for interacting with a GUI of a conventional desktop computer. For example, modes within the GUI category can include, but are not limited to, a keyboard mode, a mouse mode, a trackball mode, a joystick mode, a display mode, and the like. In contrast, the voice category can include interface modes that are accessible using a telephone or similar telephony device. Voice modes can include, for example, an automatic speech recognition (ASR) mode (or a speech input mode), a speech-synthesis mode (or a speech output mode), and Dual Tone Multiple Frequency (DTMF) mode.

A multimodal Web device can be a device that can access Web content using interface modes from both the GUI category and the voice category. For example, a multimodal device can receive speech input and provide visual output via a display. In another example, a multimodal device can receive keyboard input and provide speech output. The use of multiple interface modes to access Web content can be especially important when the content is accessed using a mobile computing device because the mobile computing device can have limited input and output capabilities.

Many mobile computing devices with GUI and voice capabilities lack the ability to simultaneously utilize the voice and GUI capabilities. For example, many Wireless Access Protocol (WAP) enabled devices can support only one communication connection at a time, which can be either a voice connection (providing voice-only interface capabilities) or a data connection (providing GUI-only interface capabilities). When such a device establishes a voice connection, it can receive and transmit acoustic signals (speech) but cannot simultaneously convey binary data. Similarly, when the device establishes a data connection, binary data can be exchanged but the acoustic signals (speech) cannot be conveyed.

One technique that permits a mobile computing device that cannot simultaneously interact in GUI and voice modes to function in a multimodal fashion involves switching between a voice and a data connection, thereby permitting a user of the device to switch from a GUI interface to a voice interface. Devices capable of switching between GUI interface modes and voice interface modes can be called sequential multimodal devices.

When switching between a GUI interface mode and a voice interface mode, a mobile computing device can access different source Web pages. For example, when in a GUI interface mode, the mobile computing device can access and render a Wireless Markup Language (WML) Web page that specifies textual data. When in a voice interface mode, the mobile computing device can request a Voice Extensible Markup Language (VoiceXML) Web page from a Web server. The Voice XML Web page can be conveyed from the Web server to a voice server. The voice server can perform text-to-speech conversions upon the Web page data and perform speech-to-text conversions upon received speech input in accordance with the VoiceXML Web page specification. Accordingly, the content of the VoiceXML Web page can be presented to the mobile computing device as a sequence of acoustic signals (speech) conveyed across a voice connection.

One problem with relying on differentially formatted Web pages in order to function in a sequential multimodal fashion is that the technique requires Web servers to provide Web pages in multiple formats. The creation and maintenance of differentially formatted Web pages can involve significant amounts of overhead; often the overhead for developing and maintaining multiple Web pages is greater than many Web content providers are willing to endure.

The overhead of the Web content provider would be substantially lessoned if a Web page specified in a multimodal fashion could be decomposed into a GUI format and a voice format for presentation upon sequential multimodal devices. At present, a multimodal Web page cannot be converted into one or more Web pages having a single modality so that the content of the multimodal Web page can be accessed using a sequential multimode device.

SUMMARY OF THE INVENTION

The present invention provides a method, a system, and an apparatus for providing multimodal Web page content upon a sequential multimodal device. More specifically, a multimodal Web page, such as an Extensible Hypertext Markup Language Plus Voice (X+V) Web page, can be requested by a sequential multimodal device that lacks the ability to directly render X+V pages. The requested X+V page can be used to generate a voice-only Web page written in a Voice Extensible Markup Language (VoiceXML) and a graphical user interface (GUI) Web page. The voice-only Web page and the GUI Web page can each be segmented into a multitude of smaller Web pages, called fragments, where a fragment can be sized accordingly to the capabilities of the sequential multimodal device.

Voice fragments can be conveyed to a voice server. The voice server can provide voice content based upon the voice fragment to the sequential multimodal device via a mobile voice channel. Additionally, GUI fragments can be conveyed to the sequential multimodal device via a mobile data channel. In one embodiment, each GUI fragment can be converted from an original markup language, such as Extensible Hypertext Markup Language (XHTML), to a more portable markup language, such as a Wireless Markup Language (WML) before being conveyed across the mobile data channel.

One aspect of the present invention can include a method of accessing an X+V Web page. The method can include the step of receiving a request for an X+V Web page from a source that lacks the ability to directly render the Web page. The Web page can be segmented into a multitude of fragments, where each fragment can consist of a single interface category, such as a GUI category or a voice category. The requesting source can receive information based upon the fragments.

When the conveyed fragment belongs to the GUI category (GUI fragment), the XHTML markup specified in the Web page can be converted into a markup language that the requesting source is capable of rendering, such as Wireless Markup Language (WML) markup. Further, the GUI fragment can be conveyed to the requesting source across a data connection, such as a Wireless Access Protocol (WAP) connection. When the conveyed fragment belongs to the voice category (voice fragment), the voice fragment can be conveyed to a voice server, such as a VoiceXML server. The voice server can convey content from the voice segment via a voice connection, such as a voice channel of a mobile wireless network.

In one embodiment, a capability of a requesting source can be determined in order to segment the Web page into fragments that do not exceed the capability of the requesting source. For example, an X+V page can be segmented into n GUI fragments, where each fragment can be rendered within the display of a receiving source. The receiving source can be a mobile device with minimal display capabilities. In another example, an X+V page can be segmented into n voice fragments, where each fragment can be short enough to be comprehended by a user of the receiving source.

In another embodiment, a specification can be received for a particular interface category. In such an embodiment, the fragment conveyed to the requesting source can belong to the specified interface category. In another embodiment, an order in which the fragments are to be conveyed to the requesting source can be determined, and the conveyance of fragments to the requesting source can occur in accordance with the determined order. Additionally, one or more links can correlate GUI fragments to voice fragments. These links can be used to determine which fragments are to be conveyed to the record source. For example, the links can be used to determine a GUI fragment, which corresponds to a voice fragment. The method can selectively convey either the voice fragment or the associated GUI fragment depending upon a user-selectable interface presentation category. In another embodiment, both the GUI fragment and the voice fragment can be conveyed to the requesting source via different communication channels. The requesting source can alternate between GUI and voice interface modes resulting in different communication channels being used and different fragments being conveyed.

Another aspect of the present invention can include a system for providing Web content upon a sequential multimodal device. The system can include a Web server and a sequential multimodal server. The Web server can provide at least one X+V Web page. The sequential multimodal server can convert the Web page into at least one voice fragment and at least one GUI fragment. The speech content derived from the voice fragment can be conveyed across a voice connection; and, the GUI fragment can be conveyed across a data connection. In one embodiment, the voice connection and the data connection can be wireless connections configured for mobile communication devices, such as cellular telephones and PDAs.

The sequential multimodal server can further include an application session manager, a publisher, a transcoder, and/or a fragmentation engine. The application session manager can determine the present interface mode of a client device. The application session manager can also manage which voice fragments and GUI fragments are conveyed by the sequential multimodal server. The publisher can manage the connectivity specifics of the voice connection and the data connection. Additionally, the publisher can convey each voice fragment and each GUI fragment across an appropriate connection. The transcoder can convert markup from one markup language to another. Further, the fragmentation engine can segment the Web page into a multitude of fragments, where the fragments can include one or more voice fragments and one or more GUI fragments.

Yet another aspect of the present invention can include a method for accessing content of multimodal Web pages. The method can receive a request for a multimodal markup Web page from a device incapable of directly rendering the multimodal markup page. In one embodiment, the multimodal markup can be X+V markup. A voice-only markup page can be generated from the multimodal markup Web page. The voice-only markup page can be segmented into multiple voice fragments, which can be written in VoiceXML. Additionally, a GUI markup page that does not include voice-enabled markup can be generated from the multimodal markup Web page. The GUI markup page can be segmented into multiple GUI fragments, which can be written in a Wireless Markup Language (WML). The voice fragments can then be correlated to corresponding GUI fragments based upon the content of the fragments. Content of the Web page can then be provided to the device using the fragments. Further, the device can selectively switch between a voice mode that renders at least one voice fragment and a graphical user interface mode that renders at least one graphical user interface fragment.

BRIEF DESCRIPTION OF THE DRAWINGS

There are shown in the drawings, embodiments that are presently preferred, it being understood, however, that the invention is not limited to the precise arrangements and instrumentalities shown.

DETAILED DESCRIPTION OF THE INVENTION

Figure 1:
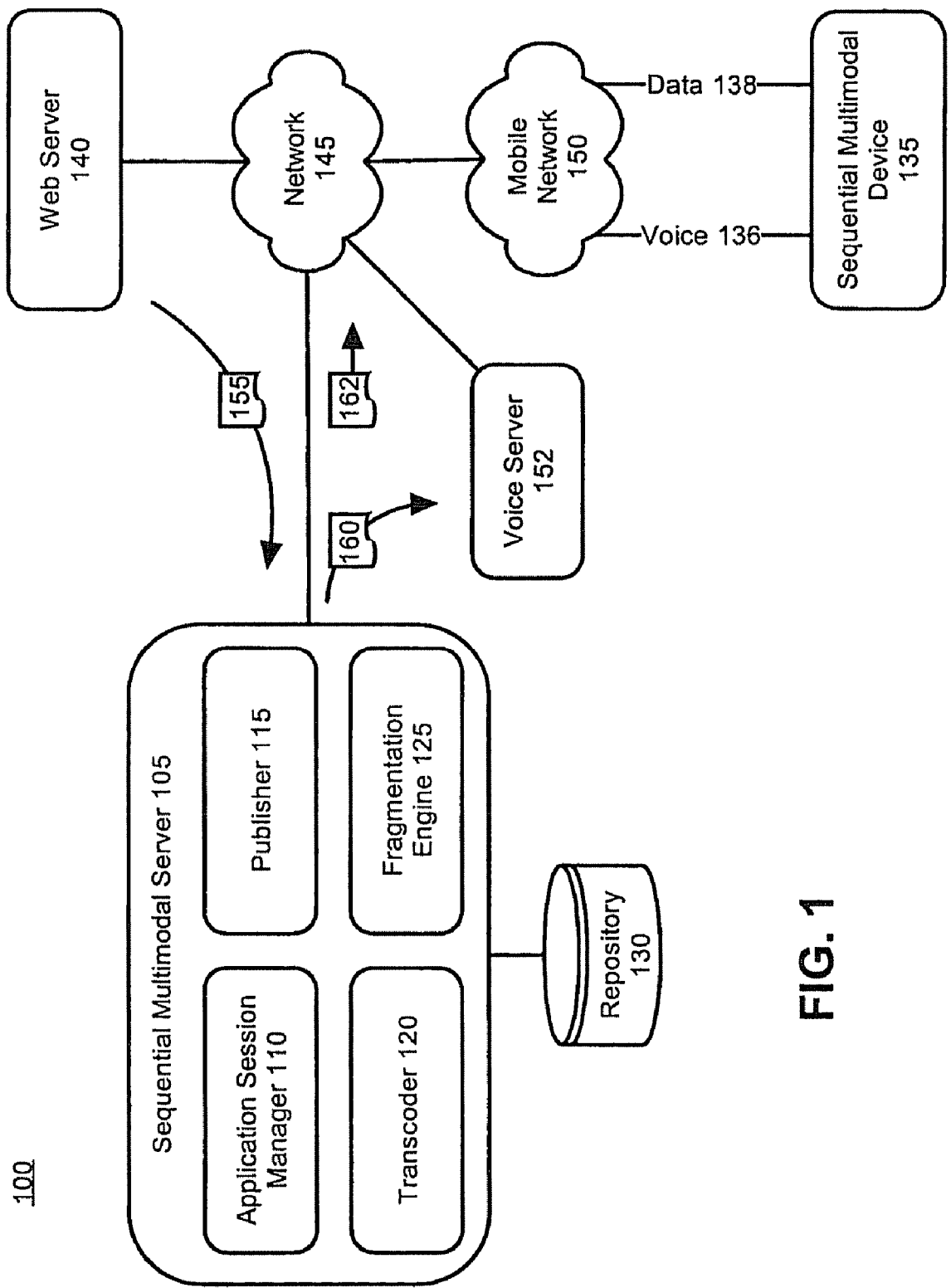
FIG. 1 is a schematic diagram illustrating a system for providing multimodal Web pages to a sequential multimodal device in accordance with the inventive arrangements disclosed herein.

FIG. 1 is a schematic diagram illustrating a system 100 for providing multimodal Web pages to a sequential multimodal device in accordance with the inventive arrangements disclosed herein. A multimodal Web page can be a Web page that permits graphical user interface (GUI) interactions and voice interactions to occur. A GUI interaction can include a keyboard response, a mouse selection, a screen touch, a visual display, and the like. A voice interaction can include a speech input interaction that can involve an automatic speech recognition (ASR) task, a speech output interaction that can involve a text-to-speech conversion, a Dual Tone Multiple Frequency (DTMF) interaction, and the like. Each interface interaction instance can be referred to as an interface mode.

The system 100 can include a sequential multimodal device 135 and a sequential multimodal server 105. The sequential multimodal device 135 can include a Web-enabled mobile computing device, such as a tablet computer, a personal data assistant (PDA), a cellular telephone, a wearable pervasive computing device, and the like. The device 135 can include capabilities for interfacing using GUI interface modes and voice interface modes, where the GUI modes can utilize data connection 138 and the voice modes can use voice connection 138. The device 135 can be restricted to one connection type (either voice connection 136 or data connection 138) at a time. Additionally, the device 135 can selectively alternate between voice connection 136 and data connection 138, thereby switching between GUI interface modes and voice interface modes. The voice connection 136 and the data connection 138 can be connections provided via a mobile network 150, such as a cellular telephony network, a personal communication services (PCS) network, and/or Wireless Access Protocol (WAP) network.

The sequential multimodal server 105 can convert a multimodal Web page 155 provided by a Web server 140 into a voice-only Web page and a GUI Web page. The voice-only Web page and the GUI Web page can be segmented into multiple smaller Web pages, referred to as fragments. Each fragment can consist of a single modality. The fragments generated by the server 105 can include a voice fragment 160 and GUI fragment 162.

The voice fragment 160 can include one or more voice-enabled markup documents, such as a Voice Extensible Markup Language (VoiceXML) document, which can be conveyed to a voice server 152. The GUI fragment 162 can include one or more GUI-enabled markup documents, such as a Wireless Markup Language (WML) document, which can be conveyed to the device 135 via the data connection 138. It should be noted that the server 105, the Web server 140, and the voice server 152 can be communicatively linked to each other through network 145, which can in turn be communicatively linked to the mobile network 150.

The server 105 can include an application session manager 110, a publisher 115, a transcoder 120, and a fragmentation engine 125. The application session manager 110 can internally manage voice and GUI fragments for the server 105. More specifically, the application session manager 110 can perform operations relating to the multitude of fragments into which the Web page 155 can be segmented. That is, the application session manager 110 can determine the order in which fragments are to be presented to the device 135, track previously presented fragments, and provide appropriate fragments responsive to requests from the device 135. Further, when all fragments derived from the Web page 155 have been presented, the application session manager 110 can retrieve another Web page from the Web server 140 in situations where further information is requested. Moreover, the application session manager 110 can track which voice fragments correspond to which GUI fragments so that appropriate fragments are conveyed when the interaction mode of the device 135 is switched between a GUI interface and a voice interface.

The publisher 115 can manage external communication connections for the server 105 and data conveyances over these connections. For example, the publisher 115 can manage the communication pathway across network 145 to Web server 140 through which the Web page 155 is received. In another example, the publisher 115 can route voice fragment 160 to the voice server 152 and provide the voice server 152 with connectivity information for communicating with the device 135 via the voice connection 136. In still another example, the publisher can route GUI fragment 162 through network 145 and mobile network 150, across data connection 138 to the device 135.

The transcoder 120 can convert markup from one markup language to another. In one embodiment, the transcoder can convert XHTML markup into WML markup so that GUI fragments originally written in XHTML can be conveyed to device 135 as WML fragments. Appreciably, the transcoder 120 is not limited to performing only XHTML to WML conversions and can convert markup from any one markup language to any other using techniques known within the art.

The fragmentation engine 125 can segment a Web page into multiple fragments, where each fragment can possess a single modality, thereby being either a voice fragment or a GUI fragment. Each fragment can be sized according to the capabilities of the device 135. That is, the memory capabilities, the processing capabilities, the display capabilities, and the like for the device 135 can be insufficient to handle the originally sized Web page 155. If so, the fragmentation engine 125 can, therefore, segment the Web page 150 into appropriately sized segments.

Further, the fragmentation engine 125 can establish associations between voice fragments and GUI fragments having similar content, so that the application session manager 110 can appropriately handle situations in which the requested interface mode for data is switched. The repository 130 can be used to store fragments created by the fragmentation engine 125.

It should be noted that the voice server 152 can be disposed in any location and need not be a standalone computing device. For example, the functionality of the voice server 152 can be implemented within the Web server 140 and/or within the sequential multimodal server 105.

Figure 2:
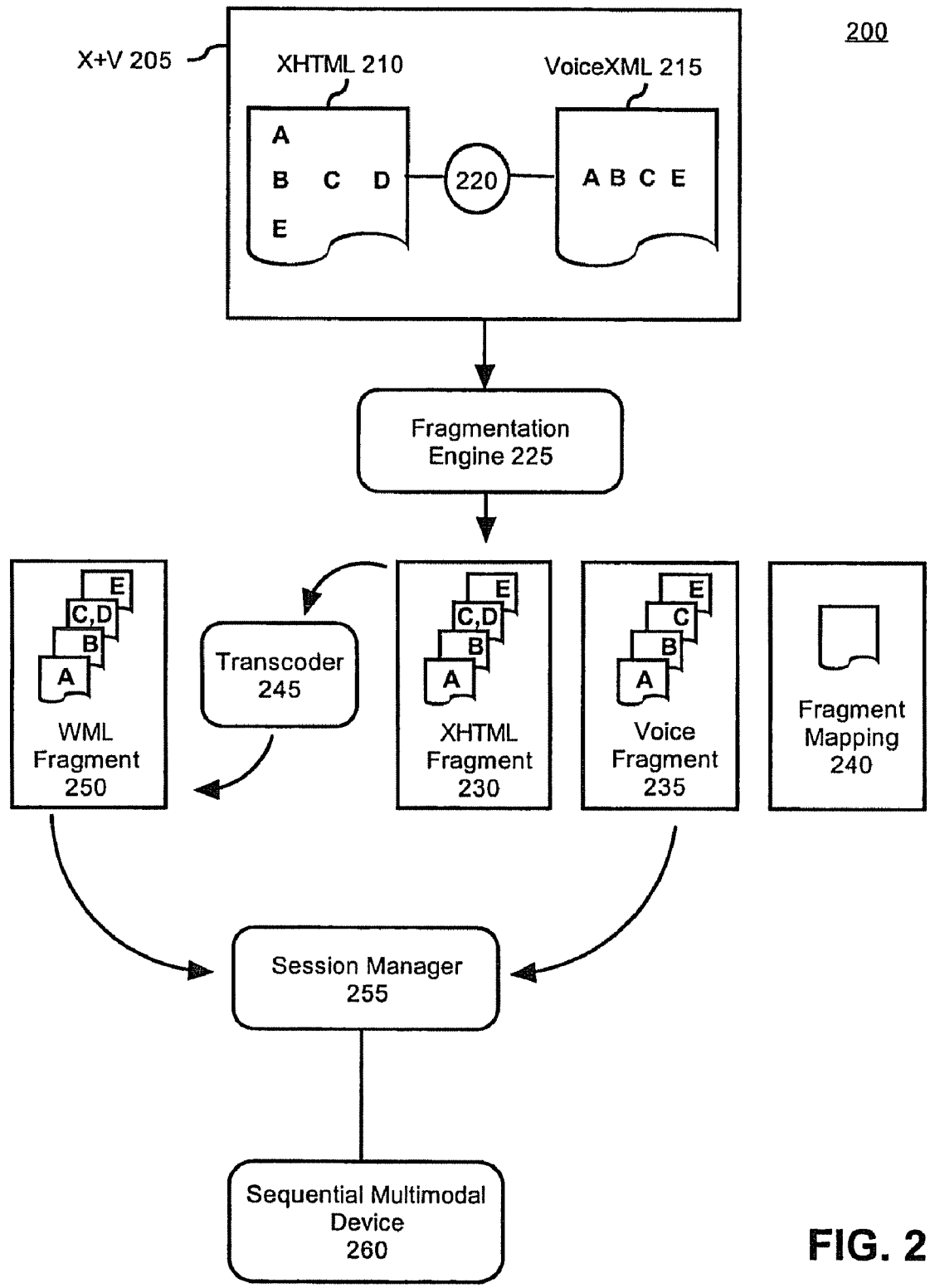
FIG. 2 is a schematic diagram illustrating a system for converting Web pages written in Extensible Hypertext Markup Language Plus Voice (X+V) into a series of single mode pages in accordance with the inventive arrangements disclosed herein.

FIG. 2 is a schematic diagram illustrating a system 200 for converting Web pages written in X+V into a series of single mode pages in accordance with the inventive arrangements disclosed herein. In system 200, the X+V page 205 can include an XHTML section 210, a VoiceXML 215 section, and an association component 220. The XHTML section 210 and the VoiceXML 215 section can specify actions and/or events for common content-based elements. For example, the XHTML section 210 and the VoiceXML section 210 can specify details for common elements A, B, C, and E. Some content-based elements (like element D) that are not easily presentable in a voice-only fashion can have no equivalent element in the VoiceXML section 215.

The X+V page 205 can be conveyed to the fragmentation engine 225 for segmentation into a multitude of XHTML fragments 230 and voice fragments 235. For example, the X+V page 205 can be segmented into the XHTML fragments A, B, C-D, and E and into the voice fragments A, B, C, and E. It should be appreciated that the fragmentation engine 225 can segment a content element of the X+V page 205 into one or more fragments and a each fragment can include one or more content elements.

The fragmentation engine 225 can also annotate fragmentation mapping 240 data for associating XHTML fragments 230 with voice fragments 235 having corresponding content. For example, XHTML fragment A can be mapped to voice fragment A; and, XHTML fragment B can be mapped by the fragment mapping 240 to voice fragment B. The XHTML fragments 230 need not map to the voice fragments 235 in a one-to-one manner.

Each of the XHTML fragments 230 can be conveyed to the transcoder 245, where the XHTML markup can be converted into WML markup. Accordingly, the transcoder 245 can generate the WML fragments 250 (WML fragments A, B, C-D, and E) from the XHTML Fragments 230 (XHML fragments A, B, C-D, and E). The Voice fragments 235 and the WML fragments 250 can be managed by the session manager 255 and conveyed to the sequential multimodal device 260 in an appropriate fashion.

Figure 3:
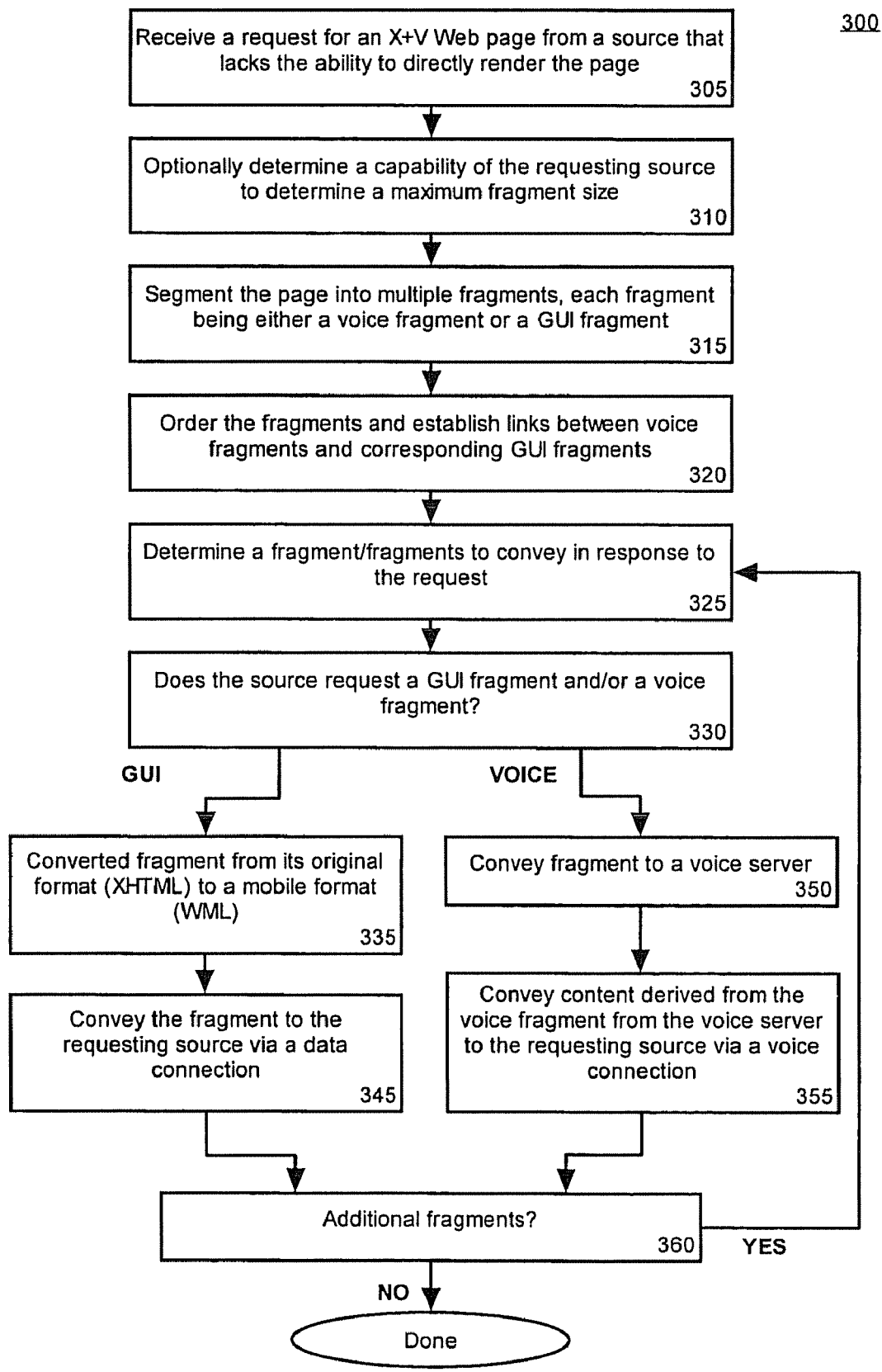
FIG. 3 is a flow chart illustrating a method for providing multimodal Web pages to a sequential multimodal device in accordance with the inventive arrangements disclosed herein.

FIG. 3 is a flow chart illustrating a method 300 for providing multimodal Web pages to a sequential multimodal device in accordance with the inventive arrangements disclosed herein. The method 300 can be performed in the context of a sequential multimodal computing device accessing content from a Web server, which provides multimodal Web pages that can include one or more X+V Web pages. Because the sequential multimodal computing device can be incapable of directly rendering the X+V Web pages, a sequential multimodal server can be used to retrieve the X+V Web pages from the Web server and provide the content in a format that is within the capabilities of the sequential multimodal computing device.

The method 300 can begin in step 305 where the sequential multimodal server can receive a request for an X+V Web page from a source that lacks the ability to directly render the page. In step 310, the sequential multimodal server can optionally receive a message detailing the specifications and/or capabilities of the requesting source. When such a message is received, the sequential multimodal server can assure that the requesting source is not conveyed data that exceeds the capabilities of the requesting sources. That is, data can be conveyed to the requesting source as fragments; and, one or more thresholds can be established for the fragments, where one such threshold can be a maximum fragment size.

In step 315, the requested X+V Web page can be retrieved from a Web server and can be conveyed to the sequential multimodal server. The sequential multimodal server can segment the Web page into multiple fragments, where each fragment can be either a voice fragment or a GUI fragment. In step 320, an order in which the fragments are to be presented can be established. Further, links can be established between voice fragments and corresponding GUI fragments, so that one or more voice fragments can be linked to one or more GUI fragments having approximately the same content.

In step 325, a determination can be made as to which fragment(s) are to be conveyed in response to the request. For example, a determination can be made as to whether a second or a third fragment derived from the X+V Web page is to be conveyed. In step 330, a further determination can be made concerning the interface mode for the requested fragment. A request can specify a GUI fragment, a voice fragment, or both are to be conveyed from the sequential multimodal server. If a GUI fragment is requested, the method can proceed to step 335; and, if a voice fragment is requested, the method can proceed to step 350.

In step 335, the GUI fragment can be converted from its original format into another format. For example, the GUI fragment can be converted from XHTML to WML. In step 345, the GUI fragment can be conveyed to the requesting source via a data connection, such as a WAP mobile connection.

In step 350, the voice fragment can be conveyed to a voice server. In step 355, the voice server can establish a voice connection with the requesting source. Content derived from the voice fragment can be conveyed as digital signals (speech) across the established voice connection. In step 360, if there are additional fragments that need to be conveyed to the requesting source, the method can progress to 325 so that the additional fragments can be conveyed. Otherwise, the method 300 is completed.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A system for providing Web content comprising:
   a Web server configured to provide at least one Extensible Hypertext Markup Language Plus Voice Web page;
   a sequential multimodal server configured to convert the Web pages of said Web server into at least one voice fragment and at least one graphical user interface fragment; and
   a sequential multimodal device supporting a voice connection at one time and a data connection at a different time, wherein speech content derived from said voice fragment is conveyed across the voice connection, and wherein said graphical user interface fragment is conveyed across the data connection.

2. The system of claim 1, wherein said voice connection and said data connection are wireless connections configured for mobile communication devices.

3. The system of claim 1, wherein said sequential multimodal server comprises:
   an application session manager configured to determine the present interface mode of a client device, and to manage which voice fragments and graphical user interface fragments are conveyed by the sequential multimodal server.

4. The system of claim 1, wherein said sequential multimodal server comprises:
   a publisher configured to manage the specifics of said voice connection and said data connection and to convey each voice fragment and each graphical user interface fragment across an appropriate connection.

5. The system of claim 1, wherein said sequential multimodal server comprises:
   a transcoder configured to convert markup from one markup language to a different markup language.

6. The system of claim 1, wherein said sequential multimodal server comprises:
   a fragmentation engine configured to segment said Web page into a plurality of fragments, said fragments consisting of at least one voice fragment and at least one graphical user interface fragment.

7. A non-transitory computer-readable storage having stored thereon, a computer program having a plurality of code sections, said code sections executable by a machine for causing the machine to perform the steps of:
   receiving a request for an Extensible Hypertext Markup Language Plus Voice Web page from a sequential multimodal device that lacks the ability to directly render said Web page;

segmenting said Web page into a plurality of fragments, each fragment consisting of a single interface category, wherein said interface category is selected from the group consisting of a graphical user interface category and a voice category; and conveying at least one of said fragments to provide the requesting sequential multimodal device with information from said Web page.

8. The non-transitory computer-readable storage of claim 7, wherein said conveyed fragment belongs to the graphical user interface category, converting an Extensible Hypertext Markup Language markup specified in said Web page into a markup language that said requesting sequential multimodal device is capable of rendering.

9. The non-transitory computer-readable storage of claim 7, wherein said conveyed fragment belongs to the graphical user interface category, said conveying step further comprising the step of conveying the fragment to the requesting sequential multimodal device across a data connection.

10. The non-transitory computer-readable storage of claim 7, wherein the conveyed fragment belongs to the voice category, said conveying step further comprising the step of said conveying said fragment to a voice server.

11. The non-transitory computer-readable storage of claim 10, further comprising the step of:

conveying content derived from the voice fragment from said voice server to said requesting sequential multimodal device across a voice connection.

12. The non-transitory computer-readable storage of claim 7, further comprising the steps of determining a capability of the requesting sequential multimodal device, wherein said segmenting step segments the Web page according to said capability so that no fragment exceeds said capability.

13. The non-transitory computer-readable storage of claim 7, further comprising the step of:

receiving a specification for a particular interface category, wherein the fragment conveyed in said conveying step belongs to the specified interface category.

14. The non-transitory computer-readable storage of claim 7, further comprising the steps of:

determining an order in which said fragments are to be conveyed to said requesting sequential multimodal device, wherein said conveying step conveys said fragments in accordance with said order.

15. The non-transitory computer-readable storage of claim 7, further comprising the steps of:

recording at least one link that correlates at least one fragment belonging to said graphical user interface category to at least one fragment belonging to said voice category; and determining a plurality of fragments to convey to said requesting sequential multimodal device, wherein said fragments belong to different interface categories, and wherein said determination is based at least in part upon said recorded links.

16. The non-transitory computer-readable storage of claim 7, wherein said at least one fragment of said conveying step includes a fragment belonging to said graphical user interface category and a corresponding fragment belonging to said voice category.

17. A system of accessing an Extensible Hypertext Markup Language Plus Voice Web page comprising the steps of:

means for receiving a request for an Extensible Hypertext Markup Language Plus Voice Web page from a sequential multimodal device that lacks the ability to directly render said Web page;

means for segmenting said Web page into a plurality of fragments, each fragment consisting of a single interface category, wherein said interface category is selected from the group consisting of a graphical user interface category and a voice category; and means for conveying at least one of said fragments to provide the requesting sequential multimodal device with information from said Web page.

18. A non-transitory computer-readable storage having stored thereon, a computer program having a plurality of code sections, said code sections executable by a machine for causing the machine to perform the steps of:

receiving a request for a multimodal markup Web page from a sequential multimodal device incapable of directly rendering said multimodal markup page;

generating a voice-only markup page from said multimodal markup Web page;

generating a graphical user interface markup page from said multimodal markup Web page, wherein said graphical user interface markup page does not include voice-enabled markup;

segmenting said voice-only markup page into a plurality of voice fragments;

segmenting said graphical user interface markup page into a plurality of graphical user interface fragments;

correlating said voice fragments to graphical user interface fragments based upon content of the fragments; and providing content of said Web page to said sequential multimodal device using said fragments, wherein said device is configured to selectively switch between a voice mode that renders at least one voice fragment and a graphical user interface mode that renders at least one graphical user interface fragment.

19. The non-transitory computer-readable storage of claim 18, wherein said multimodal markup is an Extensible Hypertext Markup Language Plus Voice markup.

20. The non-transitory computer-readable storage of claim 18, wherein said voice fragment is written in a Voice Extensible Markup Language.

21. The non-transitory computer-readable storage of claim 18, wherein said graphical user interface fragment is written in a Wireless Markup Language.

22. A system for accessing content of multimodal Web pages comprising the steps of:

means for receiving a request for a multimodal markup Web page from a sequential multimodal device incapable of directly rendering said multimodal markup page;

means for generating a voice-only markup page from said multimodal markup Web page;

means for generating a graphical user interface markup page from said multimodal markup Web page, wherein said graphical user interface markup page does not include voice-enabled markup;

means for segmenting said voice-only markup page into a plurality of voice fragments;

means for segmenting said graphical user interface markup page into a plurality of graphical user interface fragments;

means for correlating said voice fragments to graphical user interface fragments based upon content of the fragments; and means for providing content of said Web page to said sequential multimodal device using said fragments, wherein said device is configured to selectively switch between a voice mode that renders at least one voice fragment and a graphical user interface mode that renders at least one graphical user interface fragment.

* * * * *